United States Patent
Gschwind et al.

(10) Patent No.: US 9,569,188 B1
(45) Date of Patent: *Feb. 14, 2017

(54) COMPILING SOURCE CODE TO REDUCE RUN-TIME EXECUTION OF VECTOR ELEMENT REVERSE OPERATIONS

(71) Applicant: International Business Machines Corporation, Armonk, NY (US)

(72) Inventors: Michael Karl Gschwind, Chappaqua, NY (US); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,931

(22) Filed: Jul. 25, 2016

Related U.S. Application Data

(63) Continuation of application No. 14/817,695, filed on Aug. 4, 2015.

(51) Int. Cl.
    *G06F 9/44* (2006.01)
    *G06F 9/45* (2006.01)

(52) U.S. Cl.
    CPC .................. *G06F 8/4441* (2013.01)

(58) Field of Classification Search
    CPC ..................................... G06F 8/452
    USPC ....................................... 717/150
    See application file for complete search history.

(56) References Cited

U.S. PATENT DOCUMENTS

| | | | | |
|---|---|---|---|---|
| 5,027,272 A * | 6/1991 | Samuels | ............... | G06F 9/3879 712/222 |
| 5,887,183 A * | 3/1999 | Agarwal | ............. | G06F 9/30043 712/17 |
| 6,728,874 B1 * | 4/2004 | Sijstermans | ............ | G06F 7/768 712/222 |
| 7,136,953 B1 * | 11/2006 | Bisson | ................ | G06F 13/4018 710/29 |
| 7,197,625 B1 * | 3/2007 | van Hook | ........... | G06F 9/30032 710/50 |
| 7,426,597 B1 * | 9/2008 | Tsu | ..................... | G06F 13/4018 710/29 |
| 8,161,266 B2 * | 4/2012 | Colavin | ............. | G06F 9/30076 712/222 |
| 2005/0213837 A1* | 9/2005 | Boykov | ............... | G06T 7/0083 382/253 |

(Continued)

FOREIGN PATENT DOCUMENTS

CA    1264859 A    1/1990

OTHER PUBLICATIONS

IBM et al., "Flow Precedence Analysis for Optimizing Compilers", Technical Disclosure, Dec. 1974, 5 pages, IP.com (online), URL: http://ip.com/IPCOM/000082549.

(Continued)

*Primary Examiner* — Lewis A Bullock, Jr.
*Assistant Examiner* — Theodore Hebert
(74) *Attorney, Agent, or Firm* — Brandon C. Kennedy; Grant A. Johnson; Kennedy Lenart Spraggins LLP

(57) ABSTRACT

Compiling source code to reduce run-time execution of vector element reverse operations, includes: identifying, by a compiler, a first loop nested within a second loop in a computer program; identifying, by the compiler, a vector element reverse operation within the first loop; moving, by the compiler, the vector element reverse operation from the first loop to the second loop.

5 Claims, 8 Drawing Sheets

(56) References Cited

U.S. PATENT DOCUMENTS

| | | | |
|---|---|---|---|
| 2006/0125663 A1* | 6/2006 | Adiletta | G06F 8/436 341/51 |
| 2006/0171694 A1* | 8/2006 | Kamimura | H04N 3/1525 396/52 |
| 2008/0098376 A1* | 4/2008 | Fulton | G06F 8/4451 717/151 |
| 2010/0042815 A1* | 2/2010 | Gonion | G06F 8/4441 712/222 |
| 2012/0060016 A1* | 3/2012 | Eichenberger | G06F 9/30018 712/4 |
| 2014/0164733 A1* | 6/2014 | Jha | G06F 9/30032 712/4 |
| 2014/0192049 A1* | 7/2014 | Stanley | G06T 15/10 345/420 |
| 2016/0048379 A1* | 2/2016 | Gschwind | G06F 8/443 717/159 |
| 2016/0048445 A1* | 2/2016 | Gschwind | G06F 8/443 717/130 |
| 2016/0179529 A1* | 6/2016 | Corbal | G06F 9/30018 712/4 |

OTHER PUBLICATIONS

Appendix P; List of IBM Patent Applications Treated as Related, Aug. 22, 2016, 2 pages.

* cited by examiner

US 9,569,188 B1

COMPILING SOURCE CODE TO REDUCE RUN-TIME EXECUTION OF VECTOR ELEMENT REVERSE OPERATIONS

CROSS-REFERENCE TO RELATED APPLICATION

This application is a continuation application of and claims priority from U.S. patent application Ser. No. 14/817,695, filed Aug. 4, 2015.

BACKGROUND OF THE INVENTION

Field of the Invention

The field of the invention is data processing, or, more specifically, methods, apparatus, and products for compiling source code to reduce run-time execution of vector element reverse operations.

Description of Related Art

Computer systems have evolved into extremely sophisticated devices and computer systems may be found in many different settings. Advances in both hardware and software (e.g., computer programs) have drastically improved the performance of computer systems. Modern software has become very complex compared to early computer programs. Many modern computer programs have from tens of thousands to many millions of instructions. The execution time and thus, performance, of a computer program is very closely related to the number and complexity of instructions that are executed as the computer program runs. As such, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the number, arrangement and type of instructions within the computer program. Many different optimizations have been developed so the code produced by compilers has better run-time performance.

SUMMARY OF THE INVENTION

Methods, apparatus, and products for compiling source code to reduce run-time execution of vector element reverse operations are disclosed in this specification. Compiling source code to reduce run-time execution of vector element reverse operations include: identifying, by a compiler, a first loop in a computer program; identifying, by the compiler, at least one vector element reverse operation within the first loop; and replacing, by the compiler, the vector element reverse operations in the first loop by vector element reverse operations outside the first loop.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
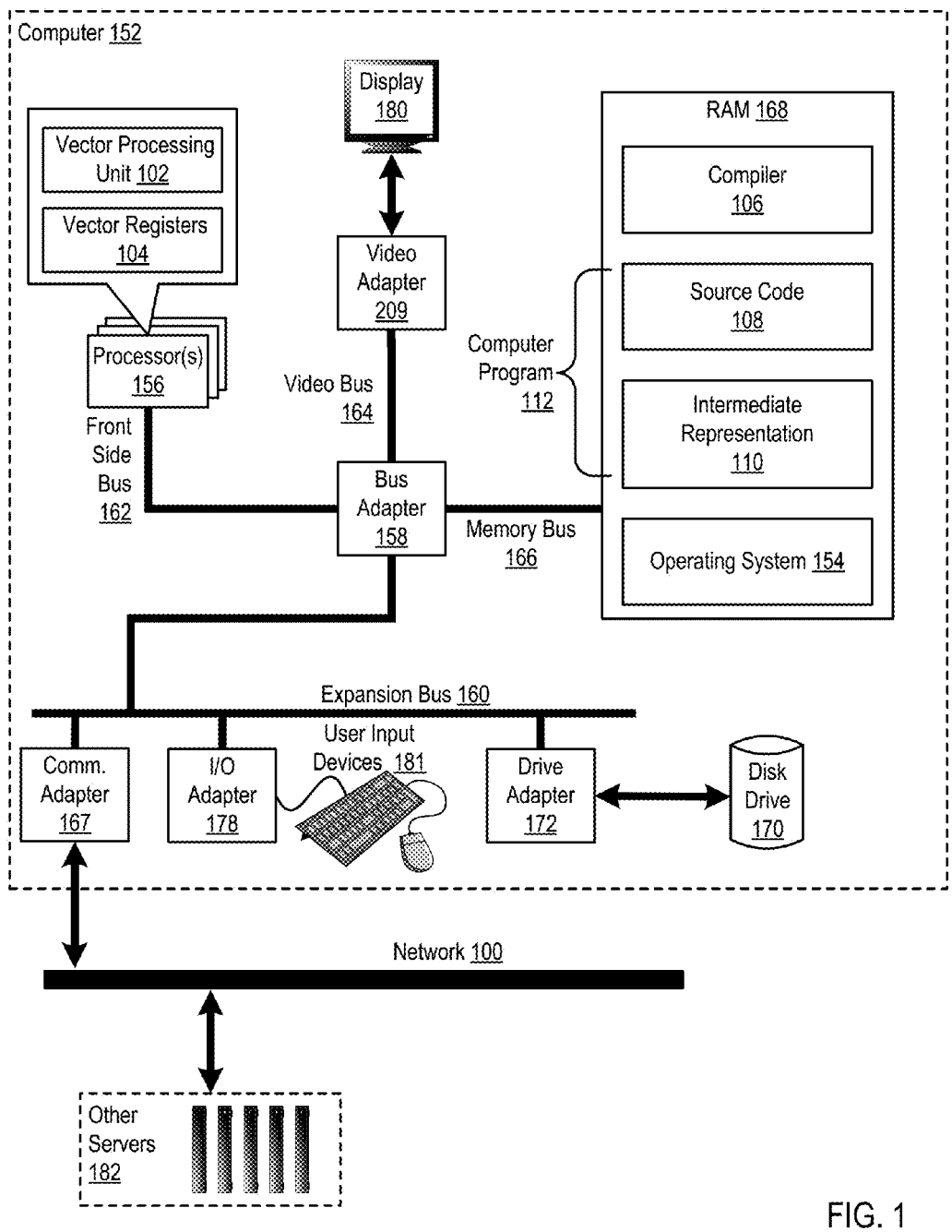
FIG. 1 sets forth a block diagram of an example system configured for compiling source code to reduce run-time execution of vector element reverse operations according to embodiments of the present invention.

Exemplary methods, apparatus, and products for compiling source code to reduce run-time execution of vector element reverse operations in accordance with the present invention are described with reference to the accompanying drawings, beginning with FIG. 1. Vector element reverse operations are operations which a compiler may insert into a computer program while compiling the program to manage order of vector elements when the program calls for vector operations.

Exploiting opportunities for parallel computation is very important for modern computing systems. One common opportunity for parallel computation arises when the same operation is to be performed on an array (or "vector") of homogeneous data elements. Today's processor instruction set architectures (ISAs) usually include a set of single-instruction, multiple-data (SIMD) instructions that can operate on 2, 4, 8, 16, or 32 values simultaneously. SIMD instructions are examples of what are more broadly termed vector instructions as used herein. For example, the Power ISA currently defines the Vector Add Floating-Point (vaddfp) instruction. This instruction operates on 128-bit vector registers, whose contents are interpreted as four 32-bit floating-point values. The corresponding values in each input register are added together and placed in the corresponding position in the output register. Thus four additions are performed using a single instruction.

Another aspect of today's processors is the concept of "endianness." This refers to how the processor stores bytes of a multi-byte value in memory. For example, a 64-bit integer in a machine register contains 8 bytes, arranged from most-significant byte (MSB) containing the bits representing the largest portions of the integer, to the least-significant byte (LSB) containing the bits representing the smallest portions of the integer. On a so-called Big Endian (BE) architecture, the same value is stored in memory with byte 0 containing the MSB, and byte 7 containing the LSB. On a so-called Little Endian (LE) architecture, the value is stored in memory with byte 0 containing the LSB, and byte 7 containing the MSB. These two methods arose for historical performance reasons that no longer matter a great deal, except that in today's world we must deal with these two incompatible views of memory.

BE and LE systems typically view values differently in vector registers as well. When an array of four 32-bit values is loaded into a 128-bit BE vector register, the zeroth element of the array occupies the most significant bytes, while the third element of the array (zero-based indexing) occupies the least significant bytes. When the same array is loaded into a 128-bit LE vector register, the zeroth element of the array occupies the least significant bytes, while the third element of the array occupies the most significant bytes. These are considered to be the "natural element order" for BE and LE memory models. The contents of each 4-byte element are represented in the same fashion on both BE and LE architectures, with the sign bit of the floating-point value placed in the most significant bit of the element.

Some ISAs (Power and ARM, for example) are designed to operate either in Big Endian mode or in Little Endian mode. In the Power ISA, the endian mode is selected with a control bit in the machine state register (MSR). Thus the same instructions are available to carry out computation regardless of endianness. This is of no concern for instructions such as "vaddfp" described above, where the computation is performed uniformly on all elements of the instruction's input and output registers. However, when an instruction implicitly or explicitly refers to the element numbering within a vector register, the numbering that is natural for one endianness is unnatural for the other.

In some cases, an ISA may provide instructions to facilitate maintaining elements in vectors using a particular element order, regardless of the endian mode specified by the programmer. For example, the Load VSX Vector Doubleword*2 Indexed (lxvd2x) instruction in the Power ISA specifically loads elements into a vector register using the BE natural element order, whether or not the machine is using the BE memory model or the LE memory model. Similarly, the Store VSX Vector Doubleword*2 Indexed (stxvd2x) reverses this transformation, storing to memory as though the elements in the vector register use the BE natural element order. Using these instructions allows a programmer to ignore the actual endian memory model in use, for a subset of data types and instructions. Data within each element are formatted in memory based on the selected endian model, e.g., in accordance with the mode selected by MSR[LE].

An instruction that regards vector elements in vector registers using BE natural element order is said to have a BE vector element endian bias. Conversely, an instruction that regards vector elements in vector registers using LE natural element order is said to have an LE vector element endian bias. When the preponderance of vector instructions in an ISA have the same endian bias, this is referred to as the inherent endian bias of the ISA.

To account for mismatch in endian bias, compilers may utilize one or more vector element reverse operations. The addition of vector element reverse operations reduces performance of executing the code in run-time, but assures correct operation. The disclosure herein is directed to a compiler that analyzes the code that includes the added vector element reverse operations and moves the vector element reverse operations to reduce the number of times the vector element reverse operations will be executed at run-time.

To that end, FIG. 1 sets forth a block diagram of an example system configured for compiling source code to reduce run-time execution of vector element reverse operations according to embodiments of the present invention. The system of FIG. 1 includes automated computing machinery configured as a computer (152). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a compiler (106), a module of computer program instructions for transforming source code written in one programming language (the source language) into another computer language (the target language, often having a binary form known as object code). The example compiler of FIG. 1 is also improved to reduce run-time execution of vector element reverse operations according to embodiments of the present invention. To that end, the compiler (106) may identify a first loop nested within a second loop in a computer program (112). In the example of FIG. 1, the computer program (112) may refer to either or both of the source code (108) and the intermediate representation (110). The source code (108) is the source program instructions that the compiler receives as an input. The intermediate representation (110) may be an output of the compiler after some compiling of the source code (108). In some compiling environments a compiler optimizer—a module of computer program instructions which may be a component of the compiler or a separate module—may optimize the code included in the intermediate representation. The output of the compiler optimizer may be provided to the compiler to finalize compiling. In some embodiments then, the compiler may identify nested loops while compiling the source code and in other embodiments the compiler (through user of an optimizer) may identify the nested loops while optimizing the intermediate representation of the compiled source code.

A 'loop' as the term is used here refers to a portion of code that, when executed, may be repeated until a condition is met. Examples of such loops include 'for' loops and 'while' loops in C-based programming languages and similar programming languages. One loop may contain another loop—called a nested loop. The nested loop is sometimes described as being 'inside' the containing loop. To that end, the nested loop may also be referred to as an inner loop and the containing loop may be referred to as an outer loop.

After identifying a first loop (optionally nested within a second loop), the compiler (106) may identify at least one vector element reverse operation in a data flow graph within the first loop and restructure the data flow graph to remove the vector element reverse operation from the first loop and replace it with one or more vector reverse operations outside the first loop. The compiler (106) may carry out this restructuring and movement of a vector element reverse operation from the inner most loop in a set of nested loops to the outermost loop of the set, or entirely outside the loop nest.

Consider, for example, three loops: an outermost loop that contains a middle loop which, in turn, contains an inner loop. In such an embodiment, the compiler (106) may identify vector element reverse operations within the inner most loop first, removing those operations and inserting vector element reverse operations into the middle loop. Then, the compiler may remove vector element reverse operations from the middle loop and insert one or more vector element reverse operations into the outermost loop. Then, finally, the compiler may remove the instructions from the outermost loop, and place them outside the outermost loop. Finally, in one or more embodiments, the compiler may optimize the data alignment completely, e.g., by combining vector reverse operations with other operations. It should further be understood that the iterative nature of moving may be accomplished in a single pass, such that the compiler may restructure a dataflow graph having at least one vector reverse operation in an innermost loop to have one or more vector reverse operations in the outermost loop, or outside the outermost loop in a single pass.

In most programs, a nested loop tends to execute at run-time a greater number of times than a loop that contains the nested loop. Moving vector element reverse operations from the innermost loop to the outer most loops in a set of nested loops therefore results, in all likelihood, a reduction in the number of executions of the moved vector element reverse operations at run-time.

The process of removing vector element reverse operations from a loop is usually profitable even when the loop is not contained within another loop. A function body always contains at least some code that is not inside any loop. For the purpose of brevity within this invention, we will call this outermost section of loop-free code a "loop," with the understanding that it does not have the normal iterating characteristic of a true loop.

Readers will understand that the compiler (106) may also be configured to perform various other optimizations to the code including optimization with respect to vector element reverse operations. Such additional optimizations and various embodiments are discussed below with respect to FIGS. 2-7.

Also stored in RAM (168) is an operating system (154). Operating systems useful compiling source code to reduce run-time execution of vector element reverse operations according to embodiments of the present invention include UNIX™, Linux™, Microsoft Windows™, AIX™, IBM's i5/OS™, and others as will occur to those of skill in the art. The operating system (154), compiler (106), source code (108), and intermediate representation (110) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for compiling source code to reduce run-time execution of vector element reverse operations according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as TCP/IP data communications networks, and in other ways as will occur to those of skill in the art. Communications adapters implement the hardware level of data communications through which one computer sends data communications to another computer, directly or through a data communications network. Examples of communications adapters useful for compiling source code to reduce run-time execution of vector element reverse operations according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
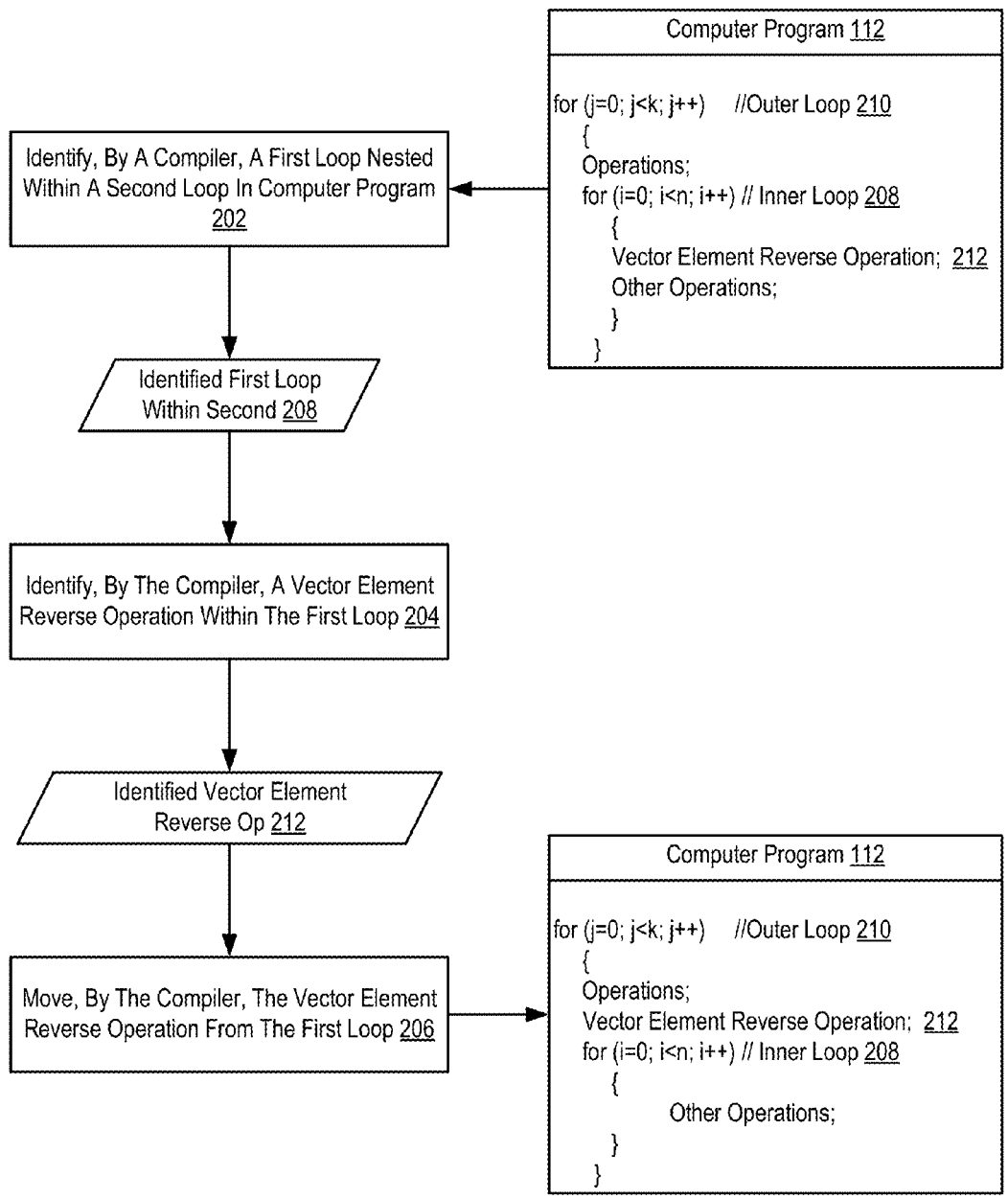
FIG. 2 sets forth a flow chart illustrating an exemplary method for compiling source code to reduce run-time execution of vector element reverse operations according to embodiments of the present invention.

For further explanation, FIG. 2 sets forth a flow chart illustrating an exemplary method for compiling source code to reduce run-time execution of vector element reverse operations according to embodiments of the present invention. The method of FIG. 2 includes identifying (202), by a compiler, a first loop (208) nested within a second loop (210) in a computer program (112). Identifying a first loop (208) nested within a second loop (210) may be carried out in a variety of way including creating a hierarchical region tree for a function of the computer program to be optimized, where each region of the tree includes one or more data flow subgraphs. The data flow subgraphs are ordered according to the flow control of the program. Then, the compiler may analyze each of the data flow subgraphs, beginning at the lowest dataflow subgraphs in the hierarchy to identify whether the dataflow graph can be optimized.

The method of FIG. 2 also includes identifying (204), by the compiler, all vector element reverse operations (212)

within the first loop (208) and moving (206), by the compiler, the vector element reverse operations (212) from the first loop (208) to the second loop (210) when the data flow graph containing said vector element reverse operations can be rewritten to allow a transformation that places one or more vector element reverse operations at its edges. In the example of FIG. 2, the computer program (112) includes example pseudo code written in a C-based programming language for clarity of explanation only, not limitation. The example computer program (112) includes two loops: a first loop (208) is referred to as an 'inner' loop because it is included in the second loop (210), referred to as the outer loop. Prior to performing the method of FIG. 2, the inner loop (208) includes a vector element reverse operation (212). The compiler, through the method of FIG. 2, identifies the vector element reverse operation (212), determines whether the data flow graph containing the vector element reverse may be rewritten so as to remove the vector element reverse from the loop by placing one or more vector element reverse operations outside the loop, and if so, restructures the data flow graph, removes the vector element reverse from the inner loop and places one or more vector element reverse operations into the outer loop (210). In another embodiment, the vector reverse is placed in an "outer loop" wherein the outer loop corresponds to code outside all loops.

With respect to "moving" of vector element reverse operations, it must be understood that moving does not refer to mere instruction scheduling, where an instruction that is loop invariant is moved from one loop to another loop. Rather, moving refers to reorganizing a data flow graph so as to perform computation on a reordered set of elements by way of vector element reverse instructions wherein the reorganizing is performed in a manner such that a vector element reverse instruction is located outside the loop from which it is moved. In one aspect of the present invention, a vector element reverse operation may correspond to any instruction rearranging vector elements upon which processing is to be performed. In another aspect of moving vector element reverse operations, moving a vector element reverse operation outside a loop may enable a compiler to remove a vector element reverse operation by combining it with its inverse, i.e., another vector element reverse operation. In yet another aspect of the vector element reverse operation, it may be optimized and removed from the program, or combined with another operation, based on available optimization opportunities.

Consider the following C++ code:

```
vector float
sum_array( )
{
    vector float psum=vec_splats (0.0f); // variable for partial
        sum, init to 4 0.0f elements extern vector float array
        [MAX];
    for (int i=0; i<MAX;i++){
        vector float addend=array[i]; // load next vector float
            array elements
        psum=vec_add(psum,addend); // add to partial sum
    }
    return psum; // return partial sum
}
```

When translated into compiler internal representation, the code will correspond for example to the following code in a little-endian environment:

```
vector float
sum_array( )
{
    vector float psum=vec_splats (0.0f); // variable for partial
        sum, init to 4 0.0f elements extern vector float array
        [MAX];
    for (int i=0; i<MAX;i++){
        vector float addend=vec_xlw4_be(i*16, (float *)&array
            [0]); // load next vector float array elements with big
            endian bias
        vector float temp=reve(addend); // reverse elements
        psum=vec_add(psum,temp); // add to partial sum
    }
    return psum; // return partial sum
}
```

In accordance with the present invention, the vector element reverse operation may be "moved" outside the loop, effectively reorganizing the dataflow graph to compute partial sums on a big endian ordering, and reversing to a little-endian ordering before returning from the function:

```
vector float
sum_array( )
{
    vector float psum=vec_splats (0.0f); // variable for
        partial sum, init to 4 0.0f elements extern vector float
        array[MAX];
    psum=reve(psum); // one vector element reverse
        moved outside the loop
    for (int i=0; i<MAX;i++){
        vector float addend=vec_xlw4_be(i*16,
            (float *)&array[0]); // load next vector float array
            elements with big endian bias
        // removed the vector element reverse from here
        psum=vec_add(psum,addend); // add to partial sum
    }
    vector float temp2=reve(psum); // another vector element reverse that is the result of removing the vector
        element reverse from the inner loop
    return temp2; // return partial sum
}
```

Those skilled in the art will see that if the loop executes at least for three iterations, at least one vector element reverse operation is saved.

Note that what has occurred here is that the variable "psum" is live on entry to the inner loop (its value is obtained from outside the inner loop), and is also anticipated on exit from the loop (its final value is needed outside the inner loop). When the compiler removes the vector element reverse operations from the inner loop, it must add vector element reverse operations outside the inner loop in order to reverse the live-on-entry and anticipated-on-exit values. Otherwise the semantics of the program would not be maintained. (For brevity, we will call an anticipated-on-exit value a "live-out" value.)

In one exemplary aspect of this optimization, additional optimizations may be performed, e.g., folding the vector element reverse (reve( )) which inverts a vector consisting of 0.0f in all elements, ensuring that an even earlier break-even point after even a single iteration, and achieving a speedup after 2 iterations:

```
float
sum_array( )
{
    vector float psum=vec_splats (0.0f); // variable for
        partial sum, init to 4 0.0f elements extern vector float
        array[MAX];
```

```
// no need to invert a vector (0.0f, 0.0f, 0.0f, 0.0f),
   optimize away vector element reverse
for (int i=0; i<MAX;i++){
    vector float addend=vec_xlw4_be(i*16,
        (float *)&array[0]); // load next vector float array
        elements with big endian bias
    // removed the vector element reverse from here
    psum=vec_add(psum,addend); // add to partial sum
}
vector float temp2=reve(psum); // another vector ele-
    ment reverse that is the result of removing the vector
    element reverse from the inner loop
return temp2; // return partial sum
}
```

Those skilled in the art will understand that a similar optimization may be performed when vector halves are inverted, e.g., transforming the original source program into:

```
vector float
sum_array( )
{
    vector float psum=vec_splats (0.0f); // variable for
        partial sum, init to 4 0.0f elements
    extern vector float array[MAX];
    for (int i=0; i<MAX;i++){
        // load next vector float array elements with reverse
            halves
        vector float addend=(vector float) vec_xld2_be(i*16,
            (double *) &array[0]);
        vector float temp=exchange halves(addend); //
            exchange halves of vector
        psum=vec_add(psum,temp); // add to partial sum
    }
    return psum; // return partial sum
}
```

When moving the vector element reverse in accordance with the previous example, the vector reverse now corresponding not to reversing the order of all floating point values in a register, but rather exchanging the upper and lower halves of a register, the following code may be generated:

```
vector float
sum_array( )
{
    vector float psum=vec_splats (0.0f); // variable for partial
        sum, init to 4 0.0f elements extern vector float array
        [MAX];
    // one vector element reverse moved outside the loop
    psum=exchange halves(psum);
    for (int i=0; i<MAX;i++){
        // load next vector float array elements with reversed
            halves
        vector float addend=(vector float) vec_xld2_be(i*16,
            (double *) &array[0]);
        // removed the vector exchange halves from here
        psum=vec_add(psum,addend); // add to partial sum
    }
    // another vector element reverse moved here to remove
        from loop
    vector float temp2=exchange halves(psum);
    return temp2; // return partial sum
}
```

More generally, this may be expressed as transforming the operation:
outer_loop(inner_loop(vr(var1), vr(var2)), var3)
to
outer_loop(vr(inner_loop(var1, var2)), var3)

or,
outer_loop_part2(inner_loop(vr(var1), vr(var2),outer_loop_part1(vr(var0)), var3)
to
outer_loop_part2(vr(inner_loop(var1, var2, vr'(outer_loop_part1(vr(var0))), var3)

Wherein outer_loop corresponds to a function representing the outer loop, outer_loop_part1 represents a portion of the outer loop that is an input to the inner loop, and outer_loop_part2 represents the part of the outer loop that receives the result of the inner loop, inner_loop corresponds to the inner loop, vr corresponds to vector reverse operation (without limitation to the actual element adjustments performed), vr' represents a vector reverse that is the inverse of the vr vector reverse, and var0, var1, var2, and var3 are 4 exemplary inputs to the computation.

Figure 3:
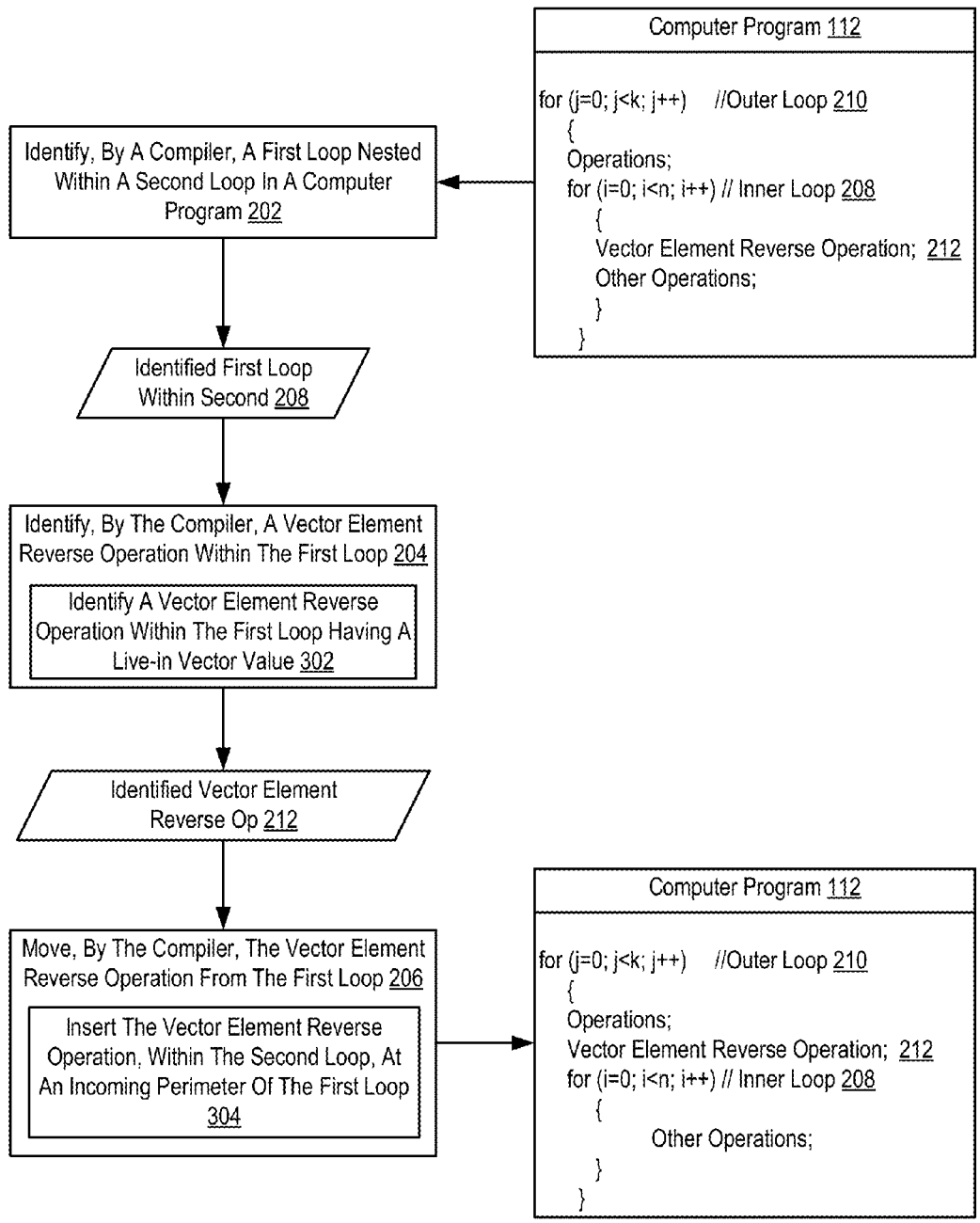
FIG. 3 sets forth a flow chart illustrating a further exemplary method for compiling source code to reduce run-time execution of vector element reverse operations according to embodiments of the present invention.

For further explanation, FIG. 3 sets forth a flow chart illustrating a further exemplary method for compiling source code to reduce run-time execution of vector element reverse operations according to embodiments of the present invention. The method of FIG. 3 is similar to the method of FIG. 2, in that the method of FIG. 3 also includes: identifying (202), by a compiler, a first loop nested within a second loop in a computer program; identifying (204), by the compiler, at least one vector element reverse operation within the first loop; analyzing a dataflow graph to determine whether it may be restructured; and restructuring a data flow graph so as to replace (206), by the compiler, one or more vector element reverse operations from the first loop by one or more vector element reverse operations out of the first loop (e.g., in the second loop).

In the method of FIG. 3, however, identifying (204) a vector element reverse operation within the first loop includes identifying (302) all vector operations within the first loop that use at least one live-in vector value. A live-in vector value refers to a value of a vector that is computed outside the inner loop prior to entering the inner loop. That is, the value of the vector to be operated on is 'live' and not modified until the vector operation is carried out.

To that end, moving (206) the vector element reverse operation from first loop outside the first loop (such as to the second loop) is carried out by inserting (304) vector element reverse operations, outside the first loop (e.g., within the second loop), at an incoming perimeter of the first loop. Such a vector element reverse operation is provided for each identified live-in vector value. The live-in value of a vector used within the inner loop may be provided at any point prior to entering the first, inner loop. To ensure that the compiler does not introduce the vector element swap operation at a point in the control flow prior to where the value is provided, the compiler places the vector element reverse operation at the incoming perimeter of the first loop.

Figure 4:
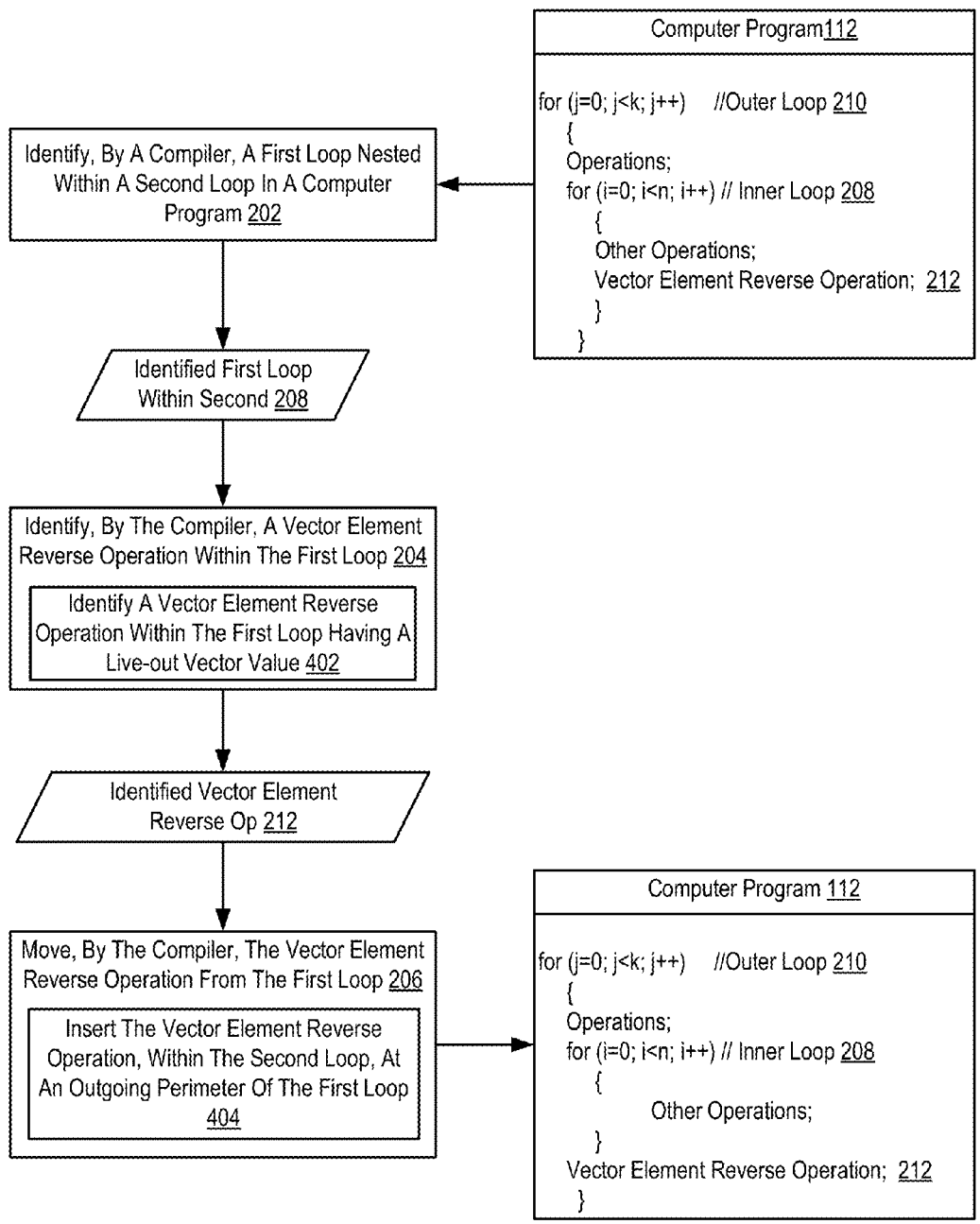
FIG. 4 sets forth a flow chart illustrating a further exemplary method for compiling source code to reduce run-time execution of vector element reverse operations according to embodiments of the present invention.

For further explanation, FIG. 4 sets forth a flow chart illustrating a further exemplary method for compiling source code to reduce run-time execution of vector element reverse operations according to embodiments of the present invention. The method of FIG. 4 is similar to the method of FIG. 2, in that the method of FIG. 4 also includes: identifying (202), by a compiler, a first loop nested within a second loop in a computer program; identifying (204), by the compiler, at least one vector element reverse operation within the first loop; analyzing a dataflow graph to determine whether it may be restructured; and restructuring a dataflow graph so as to replace (206), by the compiler, the one or more vector element reverse operations from the first loop by one or more vector element reverse operations in the second loop.

In the method of FIG. 4, however, identifying (204) the vector element reverse operations within the first loop includes identifying (402) all vector operations within the first loop having at least one live-out vector value. A live-out vector value refers to a value of a vector that is used outside the first loop after the first loop completes execution.

To that end, moving (206) the vector element reverse operations from the first loop to the second loop is carried out by removing all vector element reverse operations from the first loop, and inserting (404) a vector element reverse operation for each live-out value within the second loop, at an outgoing perimeter of the first loop. Each live-out vector value may be used at any point after exiting the first, inner loop. To ensure that the compiler does not insert the vector element swap operation at a point in the control flow prior to such a use, the compiler places the vector element reverse operation at the outgoing perimeter of the first loop.

Figure 5:
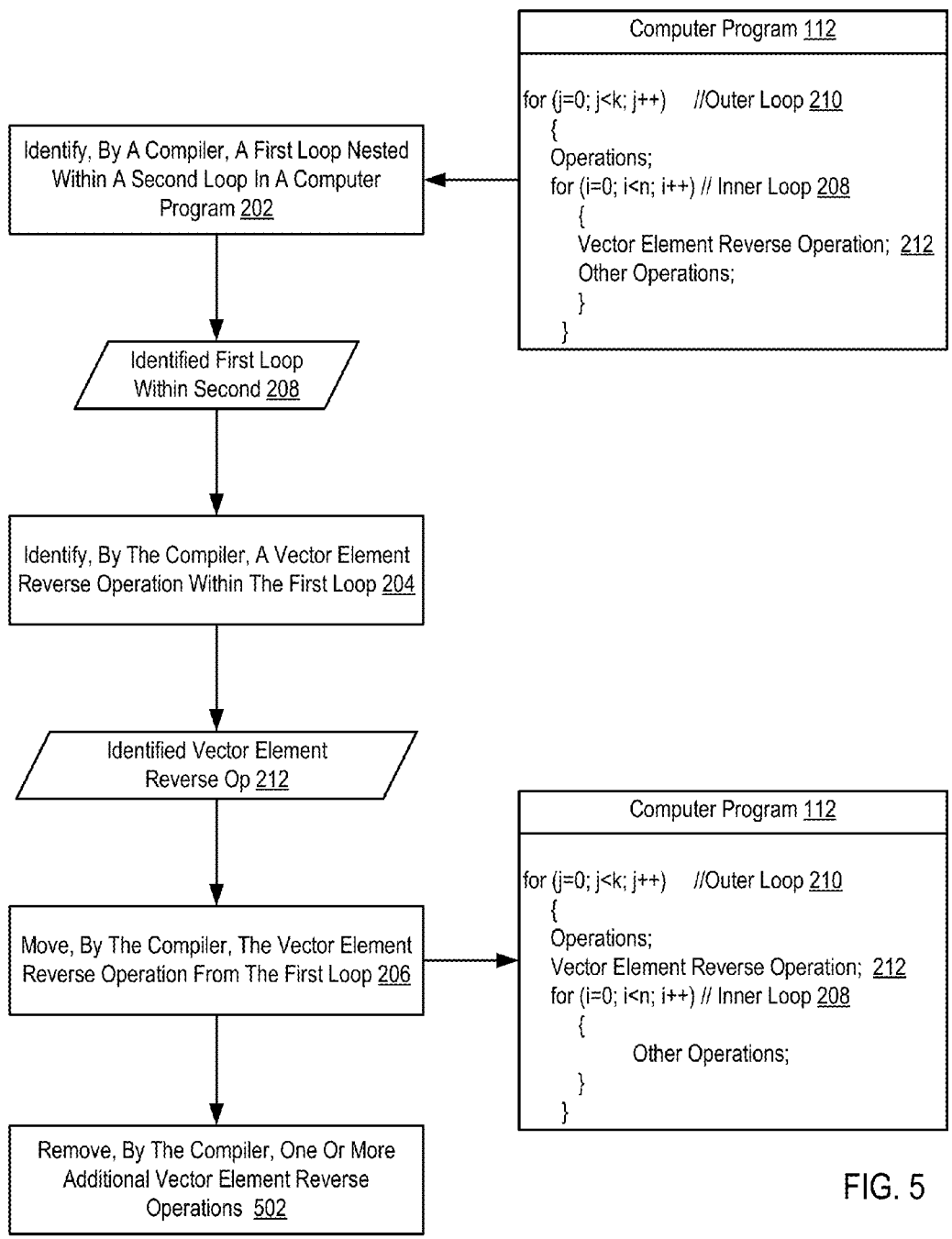
FIG. 5 sets forth a flow chart illustrating a further exemplary method for compiling source code to reduce run-time execution of vector element reverse operations according to embodiments of the present invention.

For further explanation, FIG. 5 sets forth a flow chart illustrating a further exemplary method for compiling source code to reduce run-time execution of vector element reverse operations according to embodiments of the present invention. The method of FIG. 5 is similar to the method of FIG. 2, in that the method of FIG. 5 also includes: identifying (202), by a compiler, a first loop nested within a second loop in a computer program; identifying (204), by the compiler, at least one vector element reverse operation within the first loop; analyzing a dataflow graph to determine whether it may be restructured; and restructuring the dataflow graph so as to replace (206), by the compiler, the one or more vector element reverse operations from the first loop by inserting one or more vector element reverse operations into the second loop.

The method of FIG. 5, however, also includes removing (502), by the compiler, one or more additional vector element reverse operations. In addition to moving the vector element reverse operations (212) from the inner loop (208) to the outer loop (210), the compiler in the example of FIG. 1 may also optimize the computer program (212) by removing different types of vector element reverse operations. The compiler may remove such operations from any loop, as well as the "loop" consisting of the loop-free portion of the function body. The compiler may carry out such removal in a variety of ways set forth below.

In some embodiments, for example, the compiler may identify a first vector element reverse operation and a second vector element reverse operation in the computer program, where the result of the first vector element reverse operation is the source of the second vector element reverse operation. In such an embodiment, the compiler may eliminate either or both of the first or second vector element reverse operations.

In some embodiments, the compiler may identify a unary operation accompanied by at least one vector element reverse operation. In such an embodiment, the compiler may change the order of instructions for the unary operation and the vector element reverse operation, which may lead to further opportunities to remove the vector element reverse operation.

In some embodiments, the compiler may identify a binary operation whose result is the source of at least one vector element reverse operation. In such an embodiment, the compiler may remove the vector element reverse operation that accompanies the binary operation and instead add vector element reverse operations that reverse each input to the binary operation, which may lead to further opportunities to remove the vector element reverse operations. Conversely, the compiler may identify a binary operation whose inputs are each produced by a vector element reverse operation. In such an embodiment, the compiler may remove the two vector element reverse operations that accompany the binary operation and add a vector element reverse operation following the binary operation.

In some embodiments, the compiler may identify a first instruction that specifies a vector load followed by a second instruction that performs a vector element reverse operation. In such an embodiment, the compiler may eliminate the second instruction by converting the first instruction into a third instruction that performs both the load and the element reverse operation, and thus does not require the second instruction.

In some embodiments, the compiler may identify a first instruction that is a vector element reverse operation that precedes a second instruction that is a vector store. In such an embodiment, the compiler may eliminate the first instruction by converting the second instruction into a third instruction that performs both the element reverse operation and the store, and thus does not require the first instruction.

In some embodiments, the compiler may identify a first instruction that specifies a vector load of a literal value followed by a second instruction that is a vector element reverse operation. In such an embodiment, the compiler may eliminate the second instruction by reversing order of the elements in the literal value in the first instruction.

Figure 6:
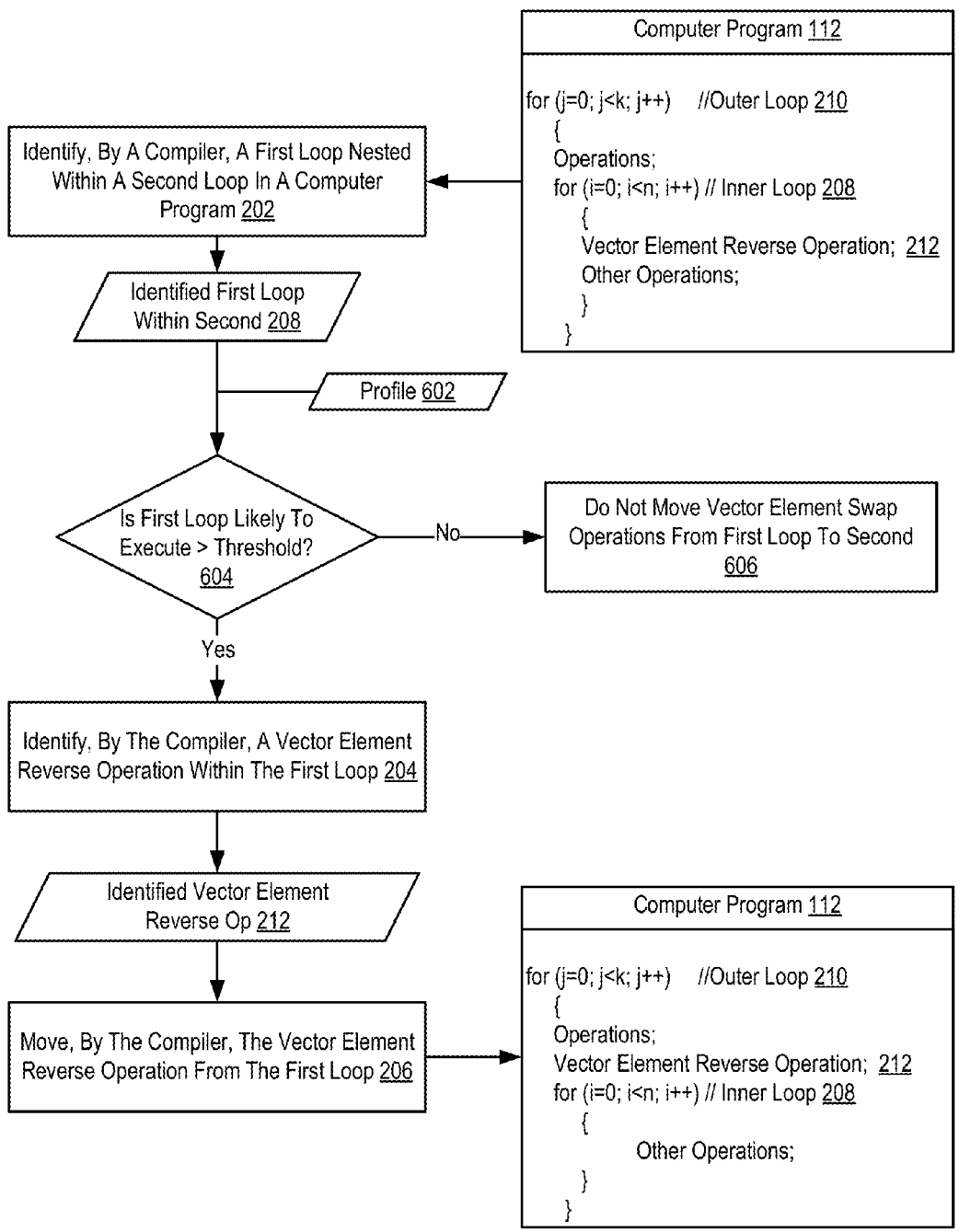
FIG. 6 sets forth a flow chart illustrating a further exemplary method for compiling source code to reduce run-time execution of vector element reverse operations according to embodiments of the present invention.

For further explanation, FIG. 6 sets forth a flow chart illustrating a further exemplary method for compiling source code to reduce run-time execution of vector element reverse operations according to embodiments of the present invention. The method of FIG. 6 is similar to the method of FIG. 2, in that the method of FIG. 6 also includes: identifying (202), by a compiler, a first loop nested within a second loop in a computer program; identifying (204), by the compiler, at least one vector element reverse operation within the first loop; analyzing a dataflow graph to determine whether it may be restructured; and restructuring the dataflow graph so as to replace (206), by the compiler, the one or more vector element reverse operations from the first loop by inserting one or more vector element reverse operations into the second loop.

The method of FIG. 6, however, also includes determining (604), in dependence upon an operational profile (602), whether the first loop (208) is likely to execute at run-time a number of times exceeding a predefined threshold. In some computer programs, an inner loop may be unlikely to execute more than an outer loop or even an appreciable number of times. In such embodiments, moving vector element reverse operations from the inner to the outer loop may actually increase the number of times that vector element reverse operations are executed at run time. To that end, a profile (602) of loops likely to execute less than a predefined threshold may be utilized to determine whether the inner loop should be optimized to move such vector element reverse operations.

As such, in the method of FIG. 6, identifying (204) the vector element reverse operations within the first loop and moving the vector element reverse operations from the first loop to the second loop is carried out only if the first loop is likely to execute at run-time a number of times exceeding the predefined threshold. If the first loop is not likely to execute at run-time a number of times greater than the predefined threshold, then the method of FIG. 6 continues by not moving (600) vector element swap operations from the first to the second loop. Instead, the compiler may carry out other vector element reverse operation optimizations such as those mentioned above with respect to FIG. 6.

Figure 7:
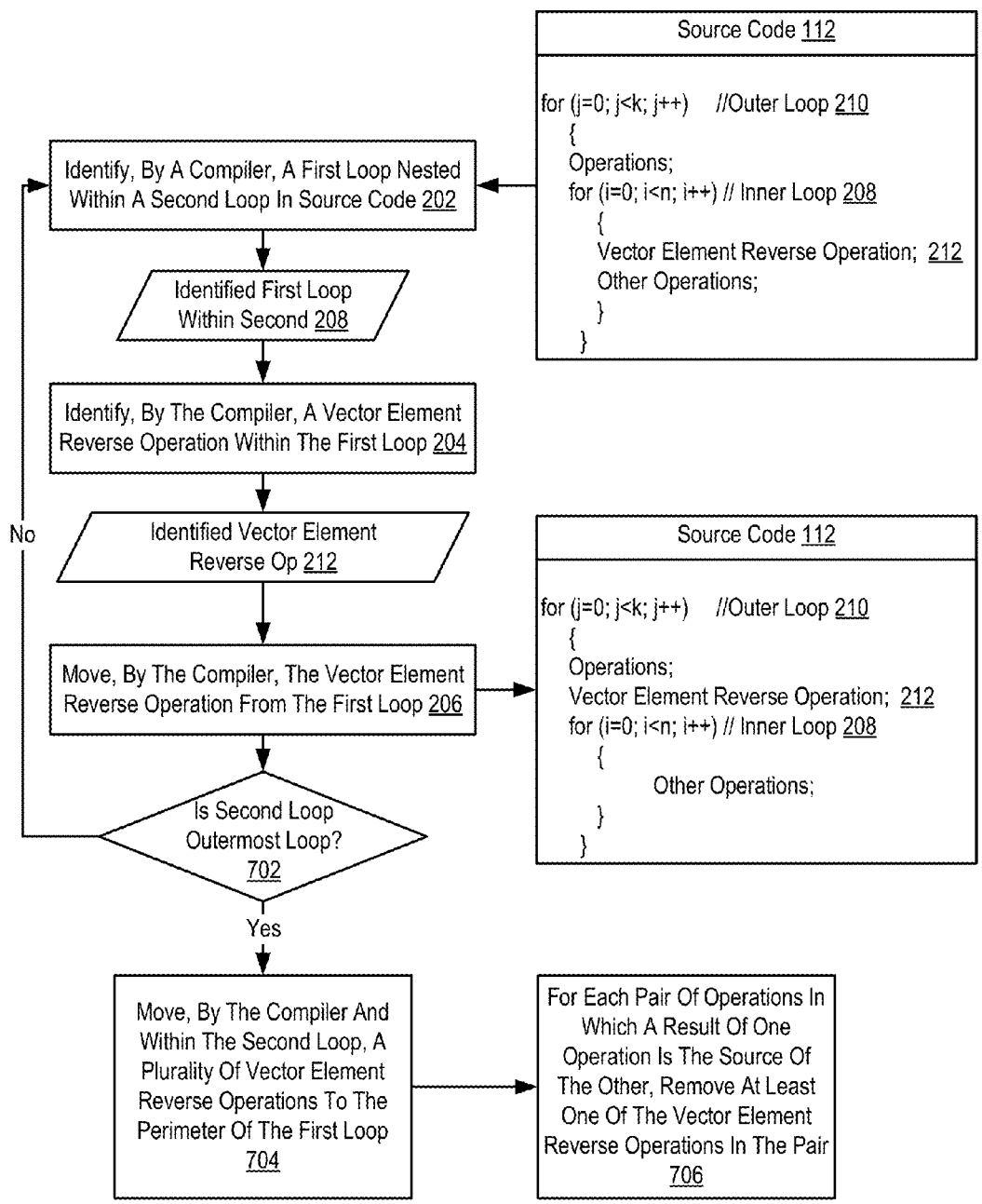
FIG. 7 sets forth a flow chart illustrating a further exemplary method for compiling source code to reduce run-time execution of vector element reverse operations according to embodiments of the present invention.

For further explanation, FIG. 7 sets forth a flow chart illustrating a further exemplary method for compiling source code to reduce run-time execution of vector element reverse operations according to embodiments of the present invention. The method of FIG. 7 is similar to the method of FIG. 2, in that the method of FIG. 7 also includes: identifying (202), by a compiler, a first loop nested within a second loop in a computer program; identifying (204), by the compiler, at least one vector element reverse operation within the first loop; analyzing a dataflow graph to determine whether it may be restructured; and restructuring the dataflow graph so as to replace (206), by the compiler, the one or more vector element reverse operations from the first loop by inserting one or more vector element reverse operations into the second loop.

The method of FIG. 7 differs from the method of FIG. 2, in that the method of FIG. 7 includes determining (702) whether the second loop is itself a true loop (i.e., is not the "loop" consisting of the loop-free portion of the function body). If the second loop (210) is a true loop, the method of FIG. 7 continues by moving (704), by the compiler and within the second loop, a plurality of vector element reverse operations to the perimeter of the first loop. That is, the compiler analyzes the dataflow subgraph of the second loop while considering the first loop as a "black box" that consumes and produces vector values. The compiler considers any value consumed by the first loop to be live-out in the second loop, and any value produced by the first loop to be live-in in the second loop. Accordingly, if the analysis of the dataflow graph representing the second loop indicates that the dataflow graph may be restructured, the compiler places vector element reverse operations at the incoming perimeter of the inner loop for live-out values, and at the outgoing perimeter of the inner loop for live-in values. If the inner loop was also successfully optimized, this will cause back-to-back vector element reverse operations to be placed at the perimeter of the inner loop.

For each pair of vector element reverse operations moved to the perimeter of the first loop in which a result of one of the vector element reverse operations in the pair is the source of the other vector element reverse operation in the pair, the method of FIG. 7 includes removing (706) at least one of the vector element reverse operations in the pair. In this way, when a vector element reverse operation in the outer loop can be moved to the perimeter of the inner loop and a vector element reverse operation is moved from the inner to the outer loop, the total number of vector element reverse operations can be reduced.

Figure 8:
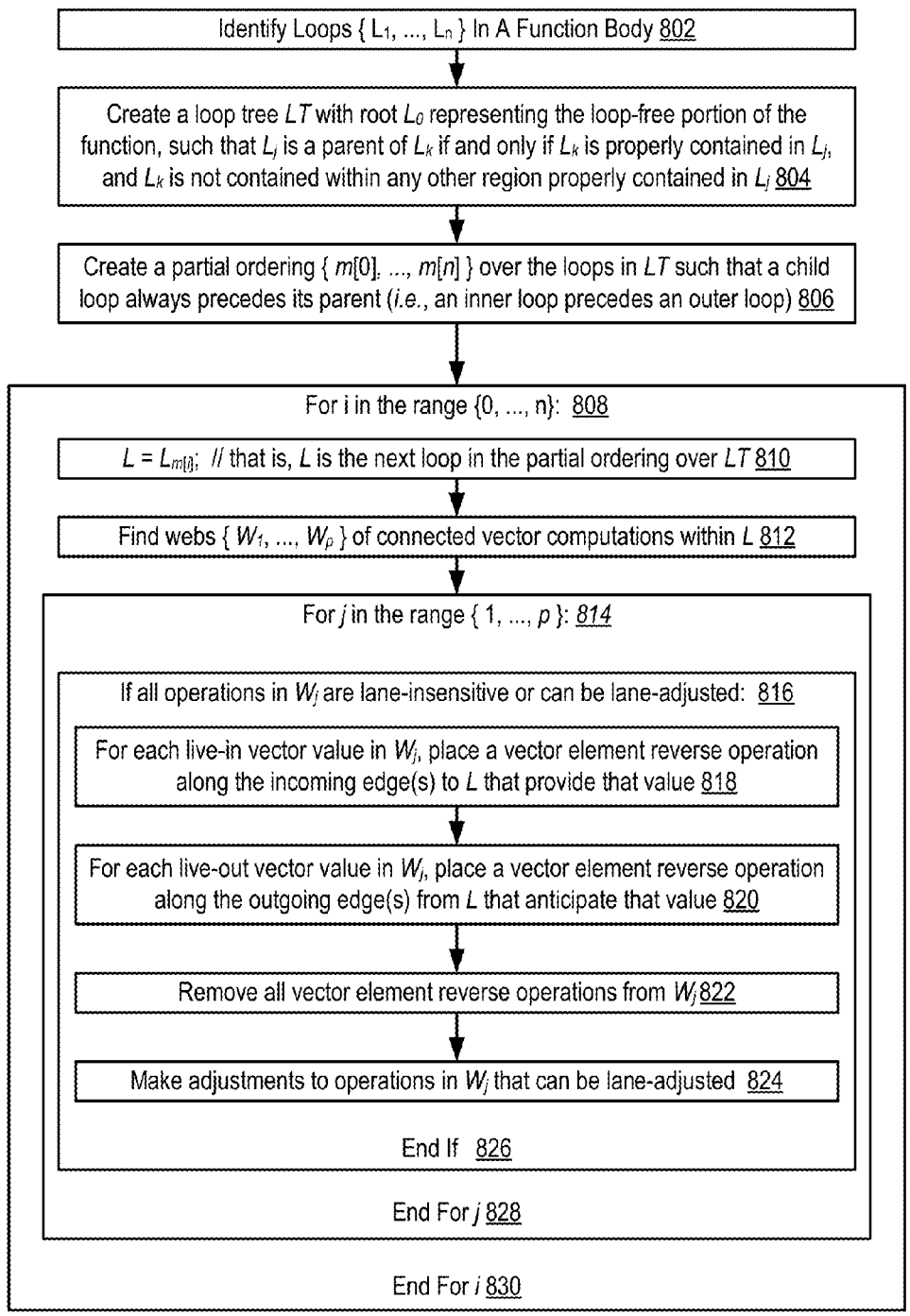
FIG. 8 depicts pseudo-code of an exemplary method for a compiler, operating on all loops within a function being compiled.

In a preferred embodiment, the exemplary embodiments and methods depicted in FIGS. 2 through 7 should be performed together in a comprehensive manner. To that end, FIG. 8 depicts pseudo-code of an exemplary method for a compiler, operating on all loops within a function being compiled.

In the example of FIG. 7 the compiler identifies (802) all the loops in the function body, using well-known techniques. The compiler then orders the loops (804 and 806) so that, if a first loop is contained within a second loop, the first loop will be considered first. There is typically more than one such ordering, and the compiler selects one arbitrarily, again using well-known techniques. In steps 808 through 830, then, the compiler processes each loop, one at a time, according to the selected ordering.

Step 810 selects the next loop to process. In step 812, the compiler analyzes all vector operations in the loop, but not within a loop contained within that loop, to determine which operations are "connected." Two vector operations are connected if one of the operations produces a value that is used by the other operation. The compiler then performs the well-known union-find technique to place vector operations into sets based on the transitive closure of the "connected" property. That is, if A and B are connected, and B and C are connected, all of A, B, and C will be placed into the same set. Such a set is called a "web," which corresponds to the notion of a dataflow graph in the description of this invention. Thus the compiler partitions all vector operations into a collection of disjoint webs, which are referenced as $W_1$ through $W_p$, where p is the number of webs. Steps 814 through 828 then process each web, one at a time, in some arbitrary order.

Step 816 performs the step of analyzing the dataflow graph that represents the web being processed, to determine whether the dataflow graph may be restructured. In a preferred embodiment, the dataflow graph may be restructured if, and only if, all of its constituent vector operations are either "lane-insensitive" or can be "lane-adjusted." A lane-insensitive vector operation is a true SIMID operation, producing n elements, such that the kth element produced depends only on the kth element of the input vectors to the operation. That is, each "lane" of the vector calculation is independent of each other lane. An operation can be "lane-adjusted" if it can be revised to operate correctly after dataflow graph reorganization in accordance with the present invention. For example, a vector element replication operation (e.g., vector splat in the Power ISA) that specifies an element of the vector may be adjusted by replacing the vector element specified with the corresponding vector element after restructuring. Thus when vector element reverse instructions are removed, a vector replication of a first element of a vector may be replaced with a vector replication of a last element of a vector. Step 816 visits each operation in the web being processed to determine if all of them are lane-insensitive or can be lane-adjusted. If not, control proceeds to step 828. If there exists a web that has not yet been processed, control then returns to step 814.

If step 816 determines that all operations in the web are lane-insensitive or can be lane-adjusted, the compiler proceeds to restructure the dataflow graph. This is done by adding vector element reverse operations outside the loop as previously described, for both live-in (step 818) and live-out (step 820) values, and then removing the vector element reverse operations from the dataflow graph, and hence from the loop (step 822). Note that steps 818 and 820 may place vector element reverse operations along edges into a loop contained by the loop being processed, which may provide opportunity for removing pairs of vector element reverse operations as previously described. Finally, the compiler adjusts any operations that must be lane-adjusted (step 824). Once again, control proceeds to step 828 and, if there exists a web that has not yet been processed, control then returns to step 814. When all webs for a loop have been processed, control proceeds to step 830. If there are loops that remain to be processed, control returns to step 808; otherwise the method of FIG. 8 is complete.

Exemplary embodiments of the present invention are described largely in the context of a fully functional computer system for compiling source code to reduce run-time execution of vector element reverse operations. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of compiling source code to reduce run-time execution of vector element reverse operations, the method comprising:
    identifying, by a compiler, a first loop and a second loop in a computer program, wherein the first loop is embedded within the second loop;
    identifying, by the compiler, at least one vector element reverse operation within the first loop;
    analyzing, by the compiler, a dataflow graph containing that at least one vector element reverse operation within the first loop, including determining whether all vector operations in a portion of the dataflow graph including the first loop are lane-insensitive and determining whether all vector operations in the portion of the dataflow graph containing the first loop are lane-adjustable; and
    responsive to the analysis, replacing, by the compiler, the vector element reverse operations from the first loop by placing the vector element reverse operations inside the second loop;
    moving, by the compiler and within the second loop, a plurality of vector element reverse operations to the perimeter of the first loop; and
    for each pair of vector element reverse operations moved to the perimeter of the first loop in which a result of one of the vector element reverse operations in the pair is the source of the other vector element reverse operation in the pair: removing at least one of the vector element reverse operations in the pair.

2. The method of claim 1 wherein:
    identifying at least one vector element reverse operation within the first loop further comprises identifying at least one vector operation within the first loop having a live-in vector value; and
    replacing the vector element reverse operations from the first loop by vector element reverse operations outside the first loop further comprises inserting vector element reverse operations at an incoming perimeter of the first loop.

3. The method of claim 1 wherein:
    identifying at least one vector element reverse operation within the first loop further comprises identifying at least one vector operation within the first loop having a live-out vector value; and
    replacing the vector element reverse operations from the first loop by vector element reverse operations in outside the first loop further comprises inserting vector element reverse operations at an outgoing perimeter of the first loop.

4. The method of claim 1 further comprising removing, by the compiler, one or more additional vector element reverse operations.

5. The method of claim 1 further comprising:
    determining, in dependence upon an operational profile, whether the first loop is likely to execute at run-time a number of times exceeding a predefined threshold; and
    identifying the at least one vector element reverse operation within the first loop and replacing the vector element reverse operations from the first loop by vector element reverse operations in the second loop only if the first loop is likely to execute at run-time a number of times exceeding the predefined threshold.

* * * * *